Patented Aug. 25, 1953

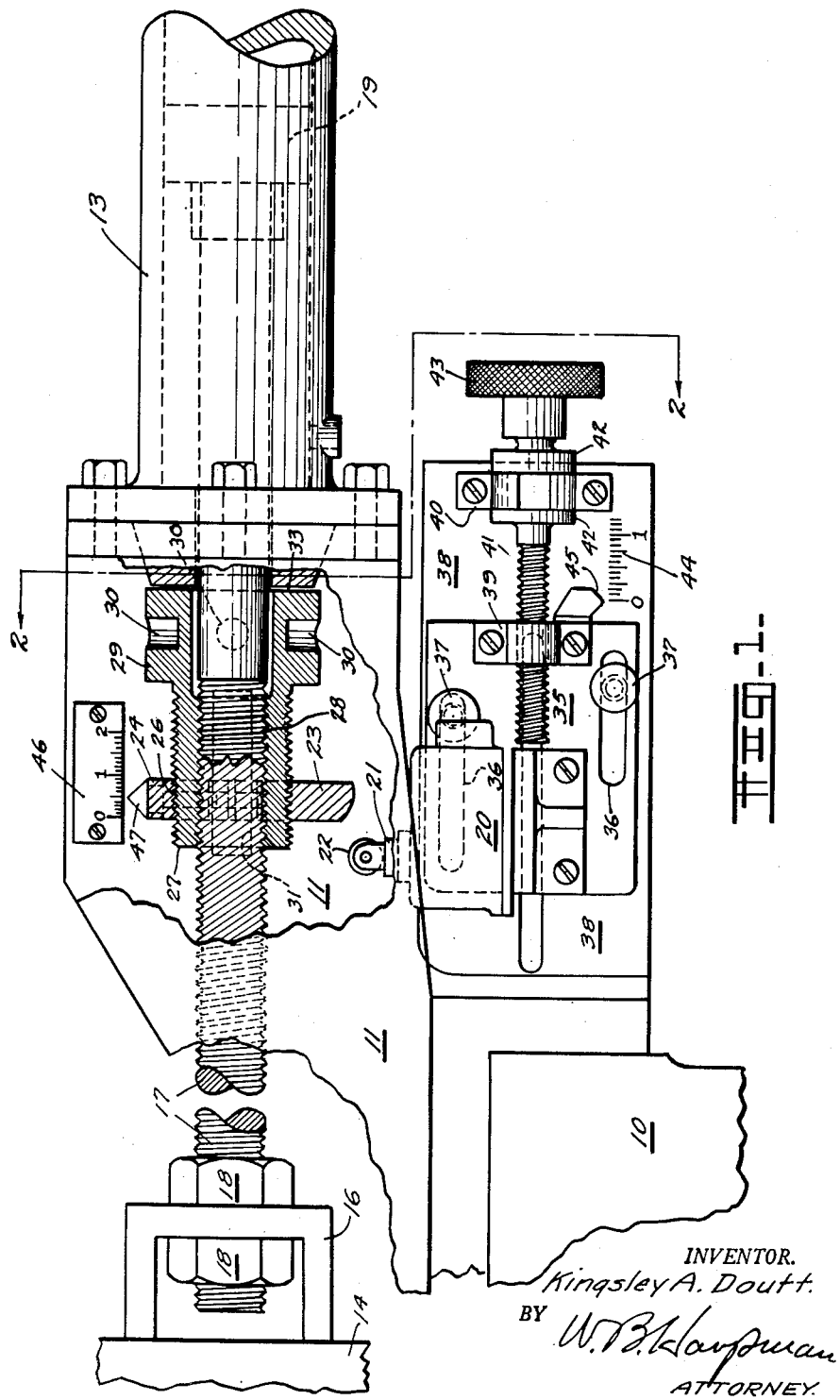

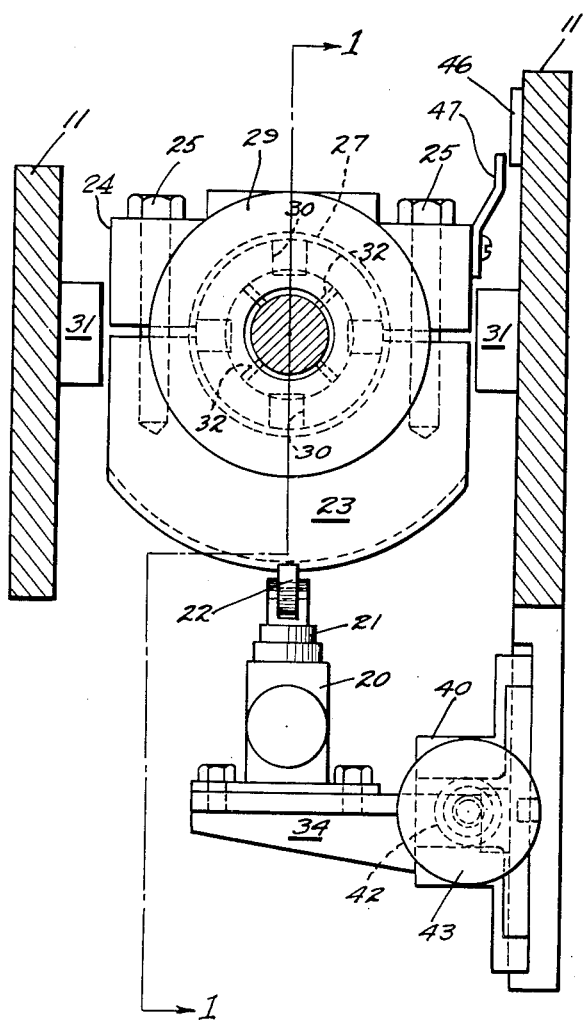

2,650,275

UNITED STATES PATENT OFFICE 2,650,275

UPSET CYLINDER STROKE ADJUSTING NUT WITH SELF-COMPENSATING CAM

Kingsley A. Doutt, Detroit, Mich.

Application April 24, 1951, Serial No. 222,623

7 Claims. (Cl. 200—82)

This invention relates to flash welding equipment and more specifically to the portion of a flash welding machine effecting connection between the upset cylinder thereof and the movable platen thereof.

The principal object of the invention is the provision of a device for adjustably connecting an upset cylinder and a movable platen of a flash welding machine to provide stroke adjustment and maintain a preset upset travel adjustment.

A further object of the invention is the provision of a device for connecting an upset cylinder and a movable platen of a flash welding machine and incorporating means indicating the particular stroke at which the flash welding machine is operating.

A still further object of the invention is the provision of a device for adjustably connecting an upset cylinder with the movable platen of a flash welding machine and arranged to indicate the amount of upset travel of the platen.

A still further object of the invention is the provision of a device for adjustably connecting an upset cylinder with the movable platen of a flash welding machine which will maintain any particular setting of upset travel regardless of the stroke adjustment.

The upset cylinder stroke adjusting nut with self-compensating cam disclosed herein comprises an improvement in the art of flash welding machines in general and in particular the manner of controlling the movement imparted the movable platen of the flash welder by the upset cylinder thereof. Those skilled in the art will recognize that the flash welding machines referred to comprise essentially a normally fixed platen having an electrode and means to secure a workpiece thereto together with a movable platen which includes an electrode and workpiece securing means, the movable platen being arranged for sliding movement toward and away from the upset cylinder and the upset cylinder is connected thereto for imparting such movement to the movable platen. Flash welding machines incorporating this construction are well known in the art and have heretofore had the common fault of providing means connecting the upset cylinder and the movable platen which made it necessary to change the upset adjustment whenever the stroke adjustment was altered. Those skilled in the art will recognize that the stroke adjustment comprises the amount of motion imparted the platen during the initial movement thereof and during which the flashing occurs. The upset movement comprises the movement following the stroke in which the platen is moved at a different rate of speed toward the fixed platen to effect the upsetting or forging of the heated members being welded.

The present invention relates to a device which effects a desirable mechanical connection between the upset cylinder and the movable platen and which device makes possible the adjustment of the stroke without affecting the adjustment of the upset portion of the stroke. It will therefore occur to those skilled in the art that a flash welding machine equipped with the device disclosed herein may be advantageously operated in that the stroke adjustment may be readily changed to suit the varying workpieces without effecting the upset adjustment which is usually satisfactory. The device disclosed herein provides adjustment over the full stroke of the upset cylinder and incorporates a self-compensating cam for controlling the amount of upset.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of a portion of a flash welding machine with parts broken away and parts in cross section and illustrating the upset cylinder stroke adjusting nut with self-compensating cam.

Figure 2 is a vertical section taken on line 2—2 of Figure 1.

By referring to the drawings and Figure 1 in particular it will be seen that a portion of a flash welding machine frame is disclosed and indicated by the numeral 10 and that it includes a cylinder supporting bracket 11 which is bifurcated and the outermost end of which carries an upset cylinder 13. The flash welding machine frame 10 also carries a movable platen 14 which has a U-shaped bracket 16 extending from one end thereof and which is engaged over one end of an upset cylinder piston rod 17 and secured thereto by a pair of oppositely disposed nuts 18. The upset cylinder piston rod 17 is threaded throughout a majority of its length and extends into the upset cylinders 13 where it is attached to a piston 19. Those skilled in the art will recognize that the movable platen 14 is one of the platens of a flash welding machine and that the upset cylinder 13 is the motivating device therefor.

Those skilled in the art will also recognize that flash welding machines are provided with means for initiating the upset action which follows the flashing action and which means usually comprises an electrical switch engaged by a lever attached to the piston rod 17 or the platen 14 of the flash welder. In the present disclosure the electrical switch is indicated by the numeral 20 and comprises a device known in the art as a "Microswitch" although any equivalent structure may be used. The switch is actuated by movement imparted a vertical extension 21 thereof which is in turn provided with a wheel 22. The lever for engaging the wheel 22 comprises an upset cam 23 which is formed as an arcuate member removably attached to a yoke 24 by a pair of bolts 25 which are passed downwardly through openings in the yoke 24 and engage threaded openings in the ends of the arcuately shaped upset cam 23 as best disclosed in Figure 2 of the drawings. The arcuate cam 23 and the yoke 24 form in effect a body member having a relatively large threaded bore 26 therethrough which is threadably engaged on a threaded outer surface of a stroke adjusting nut 27. The stroke adjusting nut 27 is also provided with a relatively large threaded bore 28 which is directly engaged on the threaded piston rod 17.

By referring again to Figure 1 of the drawings and the upper portion thereof it will be observed that the right hand portion of the stroke adjusting nut 27 is provided with an annular extension 29 which is unthreaded and of an inner diameter greater than the threaded bore 28 thereof. The outer diameter of the unthreaded extension 29 is also greater than the threaded outer portion of the stroke adjusting nut 27 and has a plurality of circumferentially spaced sockets 30 therein for the reception of a tool by which the stroke adjusting nut 27 may be rotated on the piston rod 17. It will be observed that the thread on the piston rod 17, those on the inner bore of the stroke adjusting nut 27 on the outer threaded surface thereof and the threaded bore 26 formed in the yoke 24 and arcuate cam 23 are identical as the threads have the same lead.

By referring to Figure 2 of the drawings it will be seen that the opposite sides of the yoke 24 and the cam 23 are formed with parallel vertically positioned flat surfaces which are engaged against guides 31—31 formed on the inner opposed walls of the supporting bracket 11. Rotatable motion imparted the stroke adjusting nut 27 will not be imparted to the yoke 24 or cam 23 as the same are held against such rotating action by their positioning between the guides 31. The threaded area of the stroke adjusting nut 27 is split longitudinally four places, as best shown in Figure 2 of the drawings, the split sections being indicated by the numerals 32.

It will be observed that the loosening of the bolts 25 will permit the yoke 24 and cam 23 to move slightly apart which in turn will loosen tension of the adjusting nut 27 on the piston rod 17. When so loosened the nut 27 may be rotated as hereinbefore described. Tightening the bolts 25 will tighten the assembly and effectively lock the adjusting nut 27 in predetermined location on the piston rod 17. The outermost face 33 of the annular extension 29 forms an abutment against the end of the upset cylinder or its associated structure and thereby limits the degree of travel of the piston rod 17 toward the cylinder.

It will be obvious to those skilled in the art that in order to adjust the device so as to obtain a desired stroke of the platen 14, the bolts 25 are loosened and the adjustment nut 27 rotated as hereinbefore described until it is positioned on the piston rod 17 at a desirable point which will comprise a limit with respect to further movement of the piston rod in the direction of the cylinder. Thus the length of the stroke is readily set and the desired upset time controlled by the cam 23 which remains in preset position despite adjustment of the adjusting nut 27 on the piston rod 17 as also hereinbefore described.

It will occur to those skilled in the art that it will be desirable at times to vary the point of engagement of the cam 23 with the wheel 22 and the resulting action of the switch 20 in initiating the upset portion of the flash welding cycle in the flash welding machine and the upset travel thus controlled is readily adjusted by the mechanism disclosed in the lower portion of Figures 1 and 2 of the drawings. By referring thereto it will be seen that the switch 20 is carried on a bracket 34 which in turn is mounted on a plate 35 which is slotted as at 36 and engaged over a pair of supporting pins 37 which are attached to an extension 38 of the frame of the flash welding machine. A boss 39 having a threaded bore therethrough is affixed to one end of the plate 35 and a secondary boss 40 having an unthreaded bore therethrough is affixed to the extension 38 of the frame 10 of the flash welding machine. A threaded rod 41 is engaged in the threaded bore of the boss 39 and collars 42 on an unthreaded portion of the rod 41 abut each side of the secondary boss 40.

A knob 43 is positioned on the outermost unthreaded end of the rod 41. Rotating action imparted the knob 43 will accordingly move the plate 35 back and forth and hence move the Microswitch 20 and the operating projection 21 and its wheel 22 on a plane parallel with the cam 23. A scale 44 is formed on the plate 38 and the pointer 45 on the plate 35 so that the upset travel to which the device is set may be visually determined. A scale 46 is formed on one of the supporting brackets 11 and a pointer 47 is formed on the yoke 24 and the platen stroke to which the device is set may be visually determined by referring thereto.

It will thus be seen that the device actually incorporates two separate and distinct portions which are interdependent in operation in that the relative positioning of the two and the motion of one relative to the other may be preset to achieve any desired platen stroke with any desired upset travel and that the upsetting action imparted the platen is controlled by the engagement of the parts and the closing of the Microswitch 20. Those skilled in the art will recognize that the upsetting action referred to herein comprises the introduction of additional hydraulic volume into the upset cylinder 13 and the resultant increased rate of travel of the platen 14 which element carrying one of the two electrodes of the flash welder causes the engagement of the parts to be welded in the upsetting or forging stage of the weld which follows the flashing action.

It will occur to those skilled in the art that the device as herein disclosed enables a desirable upset travel to be preset on the scale 44 and the platen stroke of the flash welder to be subsequently varied through manipulation of the adjusting nut 27 without affecting the preset upset travel as the relative positions of the cam 23 and the wheel 22 remain the same regardless of the positioning of the adjusting nut 27 and the resultant control of the platen stroke thereby. On the other hand the upset travel may be readily varied by simple adjustment of the knob 43 and the device will at all times thereafter indicate the particular upset travel at which it is set to operate along with the platen stroke travel. It will thus be seen that the several objects of the invention have been met by the device disclosed herein.

Having thus described my invention, what I claim is:

1. In a switch operating device, a threaded shaft, means for imparting reciprocating movement to said shaft, an adjusting nut threadably engaged on said shaft for movement along the shaft to adjusted positions thereon, a cam threadedly engaged on said adjusting nut, and guide means engageable with said cam and holding said cam against rotating movement with said nut, the threads on said shaft, adjusting nut and cam having an opposite pitch and an upset action controlling switch movably mounted in coplanar relation to said cam, said switch responsive in action to the movement of said cam.

2. The structure set forth in claim 1 further characterized by the formation of the cam as a two part unit having means for clamping the same on said adjusting nut and wherein the adjusting nut is split longitudinally so that it may be clamped to said shaft.

3. The structure set forth in claim 1 further characterized by the formation of the cam as an arcuate body member disposed beneath said adjustment nut and a yoke positioned over said adjustment nut and a plurality of fasteners holding said cam and yoke together and wherein the adjustment nut is split the length of its threads in a plurality of places so that it may be clamped upon said shaft by tightening said fasteners.

4. The structure set forth in claim 1 and further characterized by the formation of a scale adjacent one side of said cam and a pointer on said cam extending towards the scale whereby the degree of travel of said shaft may be visually determined.

5. The structure set forth in claim 1 and further characterized by the movable mounting of said switch comprising a plate slidably mounted for movement longitudinally of the shaft to adjusted positions and a threaded rod rotatably mounted and threadably engaging a portion of said plate whereby the switch may be moved on a plane corresponding with said cam.

6. The structure set forth in claim 1 and further characterized by the movable mounting of said switch comprising a plate slidably mounted for movement longitudinally of the shaft to adjusted positions and a threaded rod rotatably mounted and threadably engaging a portion of said plate whereby the switch may be moved on a plane corresponding with said cam and wherein a scale is provided in cooperating relation to the switch and a pointer on said plate so that the degree of upset travel may be visually determined therefrom.

7. A switch operating mechanism comprising a cylinder, a piston in said cylinder shiftable longitudinally therein, a shaft extending from said piston through an end of said cylinder and longitudinally reciprocable with the piston, said shaft being threaded for a portion of its length, a split nut threadably engaged on said shaft outwardly of the said end of said cylinder for limiting movement of said shaft with respect thereto, an annular extension on said split nut constituting a wrench-engaging portion, said split nut being externally threaded, a two part ring threadably positioned on said split nut and having a portion extending downwardly therefrom, the lower part of said two part ring having a transversely arcuate cam surface, bolts passing through openings in one of the parts of the two part ring and threadably engaging threaded openings in the other of the said parts of the two part ring whereby the split nut may be clamped on the said shaft, side edge faces of the two part ring being vertically flat, and stationary spaced parallel guides positioned at opposite sides of said two part ring and engaging the ring to hold the same against rotation, and an upset action controlling switch movably mounted in coplanar relation to said cam surface of said ring, said switch being responsive to movement of said cam.

KINGSLEY A. DOUTT.

References Cited in the file of this patent

UNITED STATES PATENTS

| Number | Name | Date |
|---|---|---|
| 2,085,049 | Spire | June 29, 1937 |
| 2,455,526 | Sciaky | Dec. 7, 1948 |
| 2,492,261 | Bordelon | Dec. 27, 1949 |

FOREIGN PATENTS

| Number | Country | Date |
|---|---|---|
| 559,653 | Great Britain | Feb. 29, 1944 |
| 758,008 | France | Oct. 23, 1933 |